(12) United States Patent
Sinutko (10) Patent No.: US 8,442,825 B1
(45) Date of Patent: May 14, 2013

(54) BIOMIMETIC VOICE IDENTIFIER

(75) Inventor: Michael Sinutko, Glen Burnie, MD (US)

(73) Assignee: The United States of America as Represented by the Director, National Security Agency, Washington, DC (US)

( * ) Notice: Subject to any disclaimer, the term of this patent is extended or adjusted under 35 U.S.C. 154(b) by 155 days.

(21) Appl. No.: 13/200,034

(22) Filed: Aug. 16, 2011

(51) Int. Cl.
| | |
|---|---|
| G10L 17/00 | (2006.01) |
| G10L 15/00 | (2006.01) |
| G10L 21/00 | (2006.01) |
| G06F 17/10 | (2006.01) |
| G06F 15/00 | (2006.01) |
| G10H 7/00 | (2006.01) |
| H04M 11/00 | (2006.01) |
| H04M 1/64 | (2006.01) |

(52) U.S. Cl.
USPC .......... 704/247; 704/231; 704/246; 704/249; 704/250; 704/200; 704/275; 704/273; 704/270; 708/300; 84/602; 379/52; 379/88.01; 379/88.02; 379/88.07

(58) Field of Classification Search .................. 708/300
See application file for complete search history.

(56) References Cited

U.S. PATENT DOCUMENTS

| | | | |
|---|---|---|---|
| 4,852,170 | A | 7/1989 | Bordeaux |
| 5,758,023 | A | 5/1998 | Bordeaux |
| 6,067,517 | A | 5/2000 | Bahl et al. |
| 6,240,192 | B1 * | 5/2001 | Brennan et al. .............. 381/314 |
| 6,738,486 | B2 * | 5/2004 | Kaulberg ...................... 381/318 |
| 7,319,959 | B1 | 1/2008 | Watts |
| 8,117,248 | B2 * | 2/2012 | Dobbek et al. ............... 708/300 |
| 2011/0116666 | A1 * | 5/2011 | Dittberner et al. ........... 381/313 |

OTHER PUBLICATIONS

K. Chong, B. Gwee, and J. Chang, ! 16-Channel Low-Power Non-uniform Spaced Filter Bank Core for Digital Hearing Aids, Sep. 2006, IEEE Transactions on Circuits and Systems, vol. 53, No. 09 pp. 853-857.*
T. Irino and R. Patterson, A compressive gammachirp auditory filter for both physiological and psychophysical data, May 2001, J. Acoust. Soc. Am., vol. 109, No. 5, pp. 2008-2022.*
M.P. Leong, C.T. Jin, P.H.W. Leong, "An FPGA-Based Electronic Cochlea", EURASIP Journal on Applied Signal Processing 2003:7, pp. 629-638.*
N. Sawhney, Situational Awareness from Environmental Sounds, Jun. 13, 1997, http://www.mendeley.com/catalog/situational-awareness-environmental-sounds/.*
H. Hermansky and N. Morgan, "RASTA Processing of Speech", IEEE Transactions on Speech and Audio Processing, vol. 2, No. 4, Oct. 1994, pp. 578-589.*

* cited by examiner

*Primary Examiner* — Paras D Shah
*Assistant Examiner* — Anne Thomas-Homescu
(74) *Attorney, Agent, or Firm* — Roshni Kurian (57) ABSTRACT

A device for voice identification including a receiver, a segmenter, a resolver, two advancers, a buffer, and a plurality of IIR resonator digital filters where each IIR filter comprises a set of memory locations or functional equivalent to hold filter specifications, a memory location or functional equivalent to hold the arithmetic reciprocal of the filter's gain, a five cell controller array, several multipliers, an adder, a subtractor, and a logical non-shift register. Each cell of the five cell controller array has five logical states, each acting as a five-position single-pole rotating switch that operates in unison with the four others. Additionally, the device also includes an artificial neural network and a display means.

2 Claims, 8 Drawing Sheets

BIOMIMETIC VOICE IDENTIFIER

CROSS-REFERENCE TO RELATED APPLICATIONS

The present application is related to U.S. patent application Ser. No. 12/806,256, entitled "INFINITE IMPULSE RESPONSE RESONATOR DIGITAL FILTER" filed on Aug. 5, 2010.

FIELD OF THE INVENTION

The present invention pertains to signal processing, and in particular to a voice identification system where "voice" includes speech and non-speech sounds.

BACKGROUND OF THE INVENTION

Current voice identification systems are limited in their ability to efficiently process audio from environments that include high noise content and multiple speakers. Consider the following prior art.

U.S. Pat. No. 4,852,170, entitled "Real Time Computer Speech Recognition System," discloses a system that determines the frequency content of successive segments of speech. While U.S. Pat. No. 4,852,170 disclosed a system that is capable of analyzing speech digitally, the present invention offers a system that allows speech to be analyzed digitally in a way that is distinguishable from the device taught in U.S. Pat. No. 4,852,170. U.S. Pat. No. 4,852,170 is hereby incorporated by reference into the specification of the present invention.

U.S. Pat. No. 5,758,023, entitled "Multi-Language Speech Recognition System," discloses a system that considers the frequency spectrum of speech. While U.S. Pat. No. 4,852,170 disclosed a system that is capable of analyzing speech digitally, the present invention offers a system that allows speech to be analyzed digitally in a way that is distinguishable from the device taught in U.S. Pat. No. 5,758,023. U.S. Pat. No. 5,758,023 is hereby incorporated by reference into the specification of the present invention.

U.S. Pat. No. 6,067,517, entitled "Transcription of Speech Data with Segments from Acoustically Dissimilar Environments," discloses a technique for improving recognition accuracy when transcribing speech data that contains data from a variety of environments. U.S. Pat. No. 6,067,517 is hereby incorporated by reference into the specification of the present invention.

U.S. Pat. No. 7,319,959, entitled "Multi-Source Phoneme Classification for Noise-Robust Automatic Speech Recognition," discloses a system and method for processing an audio signal by segmenting the signal into streams and analyzing each stream to determine phoneme-level classification. U.S. Pat. No. 7,319,959 is hereby incorporated by reference into the specification of the present invention.

While some of the prior art teaches methods of identifying multiple speakers, these methods often employ large, costly software programs that require substantial unique computing resources. Additionally, the known prior art fails to disclose an efficient and cost-effective way to identify multiple voices, in parallel, and identify the time periods that each such multiplicity of voices is present within the digitized audio that is being processed.

SUMMARY OF THE INVENTION

An object of the present invention is a device for identification of multiple arbitrary voices in parallel.

Another object of the present invention is a device for identifying the time locations of multiple arbitrary voices.

Yet another object of the present invention is a device that utilizes an infinite impulse response (IIR) resonator digital filter that is more efficiently implemented than existing IIR resonator digital filters.

The device for voice identification includes a receiver with an input and an output, a segmenter to store the output of the receiver, a plurality of IIR resonator digital filters, where a sequence of results from each IIR filter is sent to a resolver and where each IIR filter comprises a set of memory locations or functional equivalent to hold filter specifications, a memory location or functional equivalent to hold the arithmetic reciprocal of the filter's gain, a multiplexer/demultiplexer composed of a five cell controller array, a first multiplier, a second multiplier, a third multiplier, an adder, a subtractor, and a logical non-shift register to hold the intermediate states of the present invention's filtering computations. Each cell of the five cell controller array has five logical states, each acting as a five-position single-pole rotating switch that operates in unison with the four others.

Additionally, the device also includes an artificial neural network having a fixed sequence of inputs connected to both a fixed sequence of a resolver's buffer outputs and a fixed sequence of inputs of a display means that enables presenting the resolver's audio spectrum output as presented to the neural network.

DETAILED DESCRIPTION

The present invention is a device for identification of multiple voices in parallel. Additionally, the device is capable of identifying the time locations of these voices within the audio file by mimicking the essence of the human cochlea-to-brain interaction and implementing a voice identification technique.

In order to understand how the device mimics the essence of the human cochlea-to-brain interaction, it is first necessary to understand how prosody and the prosody period structure are defined.

Figure 1:
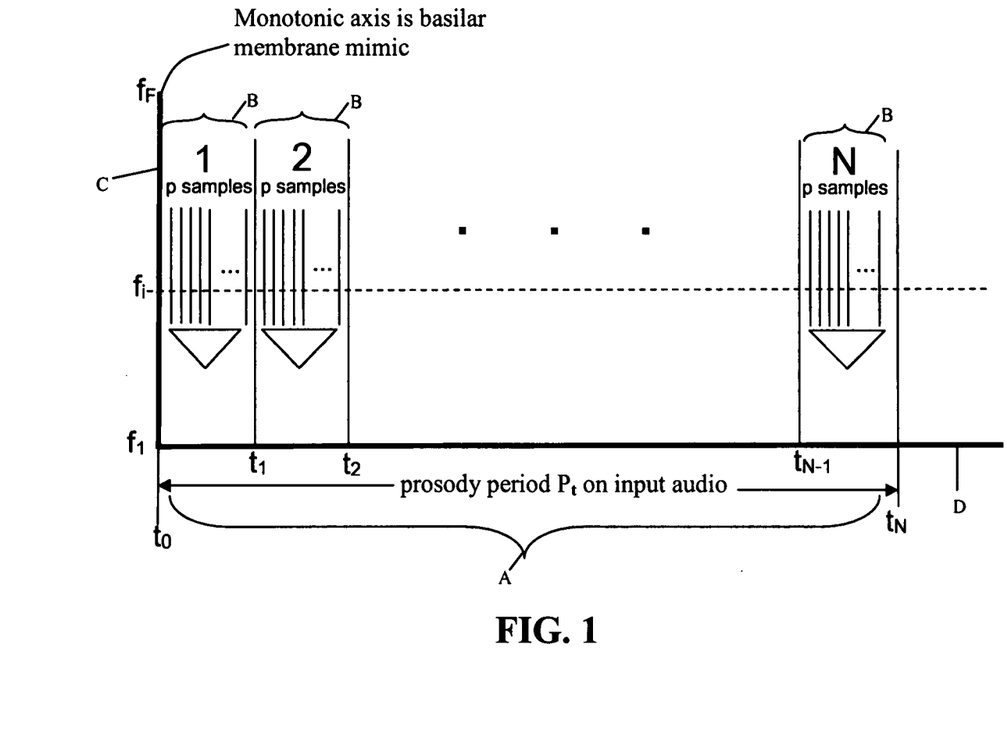
FIG. 1 depicts the prosody period structure.

Prosody as used and defined in the present invention is biologically more accurate than prosody as commonly used in the technical field of voice identification, and is evidently unique among known published definitions of prosody. Specifically, prosody in the present invention is spectral pattern matching over an amount of time defined as the Prosody Period. The Prosody Period is held constant per provided audio input to the present invention. The Prosody Period Structure is depicted in FIG. 1 and described as follows: Each prosody period $P_t$ is composed of N prosody sub periods A. Within each prosody sub period process B, a succession of p samples are filtered by each filter $f_i \in \{f_1, f_2, f_3, \ldots, f_F\}$, where $f_1 < f_2 < f_3 \ldots < f_F$.

Here, the vertical axis C represents the number of IIR filters and the horizontal axis D represents time. In one embodiment, the prosody period is composed of 40 prosody sub periods (N=40) in which 50 successive samples (p=50) per sub period are filtered per filter.

Note the following definitions:

$P = NF$, where $N = rP_t/P$;

$P_t = pN/r = N \cdot (t_{j+1} - t_j)$, $j \in \{0, 1, 2, \ldots, N-1\}$, $t_j \in \{t_0, t_1, t_2, \ldots, t_{N-1}\}$.

$p_t = p/r = $ prosody sub period

Positive real number r is defined as the input audio's sampling rate in samples per second.

Positive integer F is defined as the number of IIR filters used.

Positive integer P is the number of filtering consensus scalars resulting from the Prosody Period Structure per prosody period.

Positive real number $P_t$ is the length of the user-specified prosody period in seconds.

Positive integer p is defined as the number of inner hair cell filament-interconnected stereocilia to be mimicked by the resolver as described below.

Figure 2:
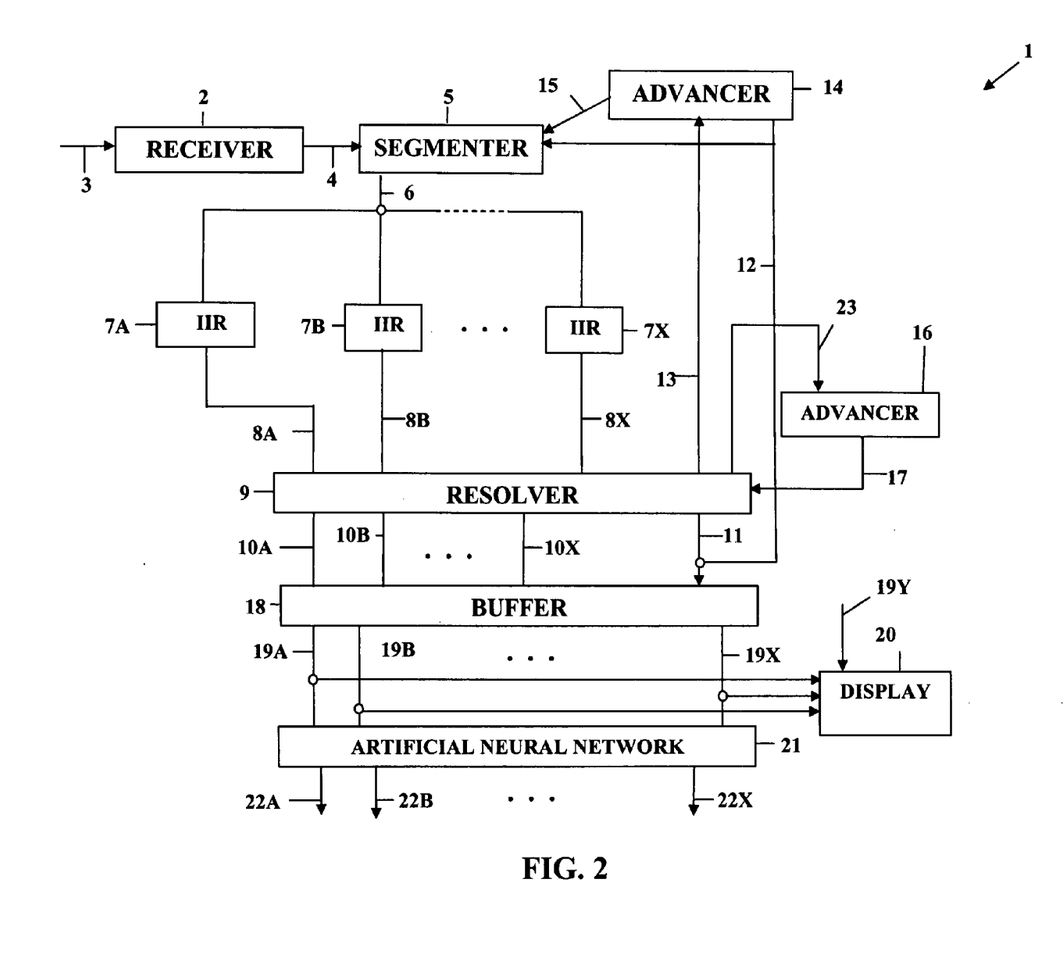
FIG. 2 is a schematic depicting a system for voice identification.

FIG. 2 is a schematic representing the device 1 for voice identification.

The device 1 includes a receiver 2 that has an input 3 for receiving a digital audio file for processing and an output 4. The device 1 also includes a segmenter 5 that has three inputs and one output 6. The segmenter 5, whose first input is connected to the output 4 of the receiver 2, segments the file received from the receiver 2 into "prosody period" cycles such that each cycle is $P_t$ seconds long. Each prosody period cycle is composed of N prosody sub periods where each prosody sub period processes p samples. Note that the initial starting time, $t_0$ of $P_t$, are specified by the present invention's end user.

The device 1 also incorporates F infinite impulse response (IIR) resonator digital filters 7A, 7B, 7X, where each filter is used to approximate the function of one inner hair cell of the human ear. The IIR resonator digital filters 7A, 7B, 7X are connected to the segmenter 5 via its output 6 which presents the amplitude of the digital audio sample currently being processed. The plurality of IIR resonator digital filters 7A, 7B, 7X are used to filter each sample from output 6 of the set of p samples in a prosody sub period. In one embodiment, the device 1 utilizes one hundred IIR resonator digital filters 7A, 7B, 7X (i.e. F=100) to filter each sample of a set of p samples, where the set of p samples is composed of 50 samples. Note that positive integer F represents the number of IIR filters 7A, 7B, 7X that filters each sample of a succession of p samples.

Each of the F IIR resonator digital filters 7A, 7B, 7X has its own output 8A, 8B, 8X, respectively, where each of the outputs 8A, 8B, 8X is connected to an input of the resolver 9. The outputs 8A, 8B, 8X corresponding to the resolver's 9 F inputs occurs for each of the p digital audio samples per prosody sub period. Per filter 7A, 7B, 7X, over p digital audio samples per prosody sub period, resolver 9, in aggregate functioning, mimics the functioning of p interconnected stereocilia atop one human inner hair cell.

In this embodiment, the resolver 9 mimics fifty such stereocilia (p=50) per prosody sub period per filter (hair cell) equating to 100 hair cell outputs 40 different times (40 successive sub prosody periods) over one prosody period. The resolver 9 also has an additional input 17 that that is connected to the output of a second advancer 16 (discussed below).

The resolver 9 also has a plurality of outputs 10A, 10B, 10X, which present F filtering consensus results following the processing of all p digital audio samples in a prosody sub period, that are connected initially to the first F inputs of a buffer 18, and additional outputs 11, 12, 13, and 23 that are connected to the buffer 18, the segmenter 5, a first advancer 14, and a second advancer 16 respectively. In total, the resolver 9 has F+1 inputs and F+3 outputs. Additionally, the resolver 9 also includes two counters (not shown). The first counter tracks the count of prosody sub periods per prosody period (i.e. from 1 to N) while the second counter tracks the number of samples per prosody sub period (i.e. from 1 to p).

For each prosody sub period, the resolver 9 computes, after each set of F filterings applied to each of p successive audio samples delivered to the filters via output 6 of segmenter 5, a consensus amplitude per frequency, thereby mimicking the stereocilia result of a frequency's corresponding inner hair cell to store in buffer 18 for subsequent delivery to an artificial neural network 21 (described below), thereby mimicking amplitudes to deliver to the brain's auditory cortex. In the preferred embodiment, each consensus amplitude is the maximum absolute value from among each filter's p output amplitudes per prosody sub period.

Whenever the resolver's 9 first counter (not shown) is equal to N, which occurs upon each Nth delivery of resolver's 9 F outputs 10A, 10B, 10X to buffer 18, a control signal is sent via the resolver's 9 output 12 to the segmenter 5 causing the prosody period to restart resolution milliseconds later in the digital audio delivered via the receiver's 2 output 4 unless a new prosody period no longer fits in the remaining input audio, the latter condition stopping the device 1 for the current audio via input 3. In this embodiment, resolution=5. The resolver 9 also sends a control signal via its output 13 to the first advancer 14 upon sensing the completion of each set of F filterings per audio sample amplitude that is presented at output 6. The first advancer's 14 output 15 causes the segmenter 5 via its output 6 to advance one successive audio sample, within its digital audio input, to the IIR filters 7A, 7B, 7X. Note that the initial sample is specified by the present invention's user.

Additionally, whenever the resolver's 9 second counter (not shown) is equal to p, the resolver 9 sends a control signal via the resolver's output 23 to a second advancer 16. The second advancer 16 causes the resolver 9 to release its current F outputs to the next available F inputs of a buffer 18, and causes the resolver 9 to begin accepting the next p groups of F outputs from filters 7A, 7B, 7X via its corresponding inputs 8A, 8B, 8X.

The device 1 also includes an artificial neural network 21 that has a plurality of inputs equal to the value of P, where each of the plurality of inputs is connected to each of the corresponding outputs 19A, 19B, 19X of the buffer 18. The artificial neural network 21 also has a plurality of outputs 22A, 22B, 22X equal to the value of C, where C is defined as the number of classes trained into the artificial neural network 21.

The buffer 18 accumulates N prosody sub periods of data, then adjusts said data, then simultaneously releases the adjusted data at one time to the artificial neural network 21 in response to a signal via output 11 of resolver 19. Simultaneously, the buffer's 18 P output scalars 19A, 19B, 19X are sent to a spectral display means 20 which has been programmed to meaningfully interpret the given signals.

At the point when $N = (r \cdot P_t/p)$ iterations are complete, said adjustments to the accumulated data in buffer 18 include biasing the data according to a curve, amplifying the biased data, and normalizing the amplified results over the biased and amplified P scalars in buffer 18.

In the preferred embodiment, buffer 18 first applies a human hearing response biasing curve and then applies a logarithmic amplification to each scalar using natural log (aka, log base e), specifically, log(scalar+1). The result is then normalized to 1.0. The normalizing of the buffer's 18 biased and amplified contents after N resolver 9 to buffer 18 iterations are complete, i.e., when a prosody period is completed, mimics a human's concentrating on a sound within a prosody period while trying to identify it. After the N iterations are completed, resolver 9 signals authority to the buffer 18, via output 11, to release its contents to the artificial neural network 21 and, via output 12, to advance the segmenter 5 resolution positive real milliseconds later where the segmenter 5 begins a new cycle if at least $P_t$ seconds of input audio are available at its input 4. If at least $P_t$ seconds of input audio are not available at its input 4, the segmenter 5 halts. Note that the number resolution is specified by the present invention's user. The successive segmenter 5 cycles, which apply the Prosody Period Structure described above, every succeeding resolution milliseconds, mimics the continual process of human listening. The likelihood that some subset of sounds trained into the artificial neural net 21 matches the input audio during the current prosody period is represented as a scalar at each of the artificial neural network's outputs 22A,22B,22X.

In this embodiment, this scalar is in the range 0 through 1.0 where 0 represents that there is no likelihood that some subset of sounds trained into the artificial neural net 21 matches the input audio within the current prosody period. In contrast, a scalar having the value of 1.0 represents the greatest likelihood that some subset of sounds trained into the artificial neural net 21 matches the input audio within the current prosody period. Additionally, logarithmically amplifying the buffer's 18 contents before normalization helps in overcoming a neural network's typical inability to effectively recognize widely dynamic scalars within its present range of comparison (the prosody period) by amplifying low amplitude scalars notably more than high amplitude scalars.

Figure 3:
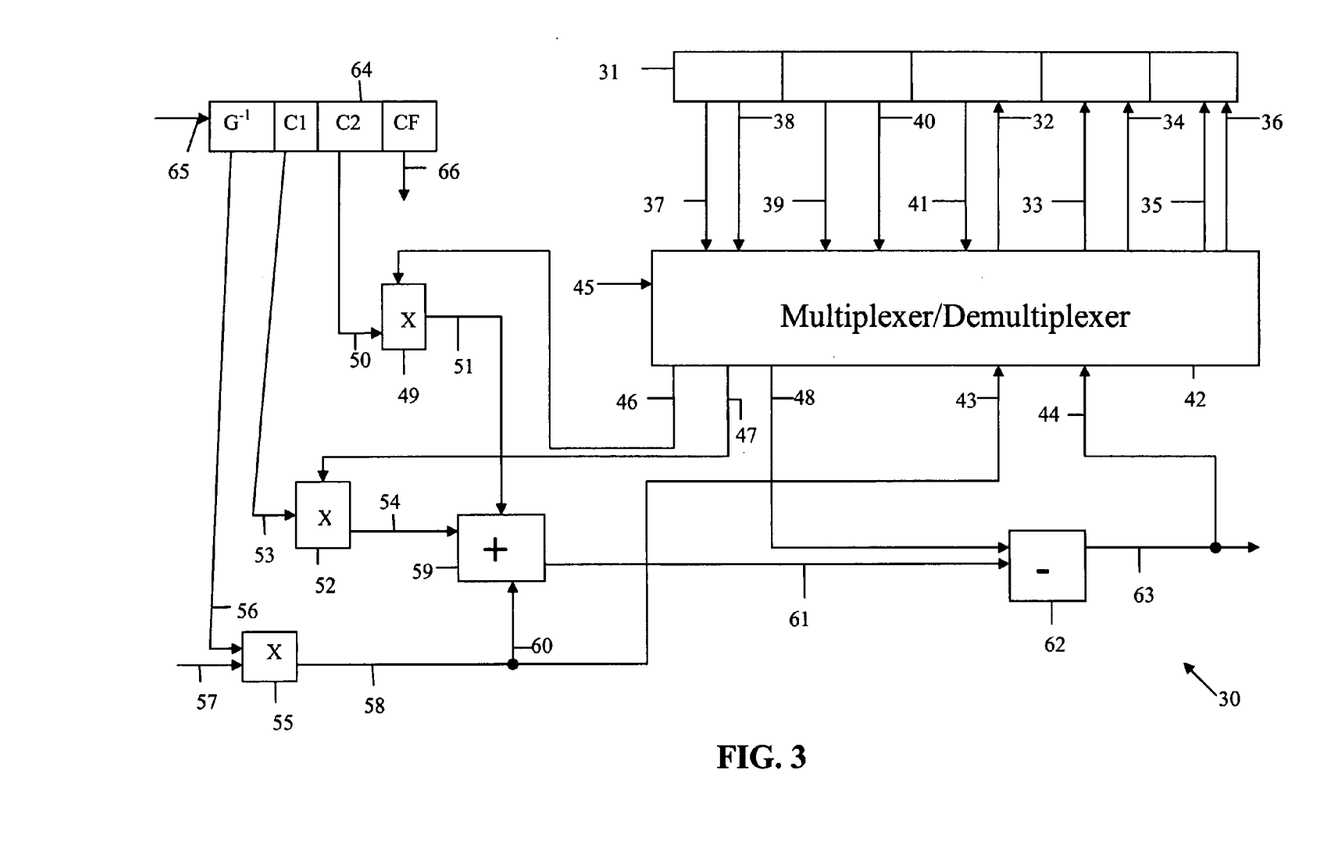
FIG. 3 is a schematic depicting the infinite impulse response resonator digital filter.

FIG. 3 is a schematic of each IIR resonator digital filter 30 that is utilized in the present invention.

Each IIR resonator digital filter 30 includes a first register 31 that has a first input 32, a second input 33, a third input 34, a fourth input 35, a fifth input 36, a first output 37, a second output 38, a third output 39, a fourth output 40, and a fifth output 41.

Each IIR resonator digital filter 30 also includes a multiplexer/demultiplexer 42. The multiplexer/demultiplexer 42 has a first input connected to the first output 37 of the first register 31, a second input connected to the second output 38 of the first register 31, a third input connected to the third output 39 of the first register 31, a fourth input connected to the fourth output 40 of the first register 31, a fifth input connected to the fifth output 41 of the first register 31, a sixth input 43, a seventh input 44, and a control input 45. The multiplexer/demultiplexer 42 also has several outputs including a first output connected to the first input 32 of the first register 31, a second output connected to the second input 33 of the first register 31, a third output connected to the third input 34 of the first register 31, a fourth output connected to the fourth input 35 of the first register 31, a fifth output connected to the fifth input 36 of the first register 31, a sixth output 46, a seventh output 47, and an eighth output 48.

Each IIR resonator digital filter 30 also includes a first multiplier 49, a second multiplier 52, and a third multiplier 55. The first multiplier 49 has a first input connected to the sixth output 46 of the multiplexer/demultiplexer 42, a second input 50, and an output 51.

The second multiplier 52 has a first input connected to the seventh output 47 of the multiplexer/demultiplexer 42, a second input 53, and an output 54.

The third multiplier 55 has a first input 56, a second input 57 which is supplied with successive audio samples via output 6 of segmenter 5 (shown in FIG. 1), an output 58 connected to the sixth input 43 of the multiplexer/demultiplexer 42.

Each IIR resonator digital filter 30 also includes an adder 59 that has a first input connected to the output 51 of the first multiplier 49, a second input connected to the output 54 of the second multiplier 52, a third input 60 connected to the output 58 of the third multiplier 55, and an output 61.

Additionally, each IIR resonator digital filter 30 includes a subtractor 62. The subtractor 62 has a first input connected to the output 61 of the adder 59, a second input connected to the eighth output 48 of the multiplexer/demultiplexer 42, and an output 63 that is connected to the seventh input 44 of the multiplexer/demultiplexer 42. Each IIR filter's 30 output appears at the output 63 of the subtractor 62 where output 63 supplies in succession, internal to resolver 9 (shown in FIG. 1), each of the p samples shown in the figure above (in paragraph 0023) from its corresponding filter, per prosody sub period.

Finally, each IIR resonator digital filter 30 includes a second register 64. This second register 64 has an input 65 and a first output 56, a second output 53, a third output 50 and a fourth output 66. The second register 64 receives and stores four values via its input 65 prior to the activation of device 1 (shown in FIG. 1). These values represent an inverse of the user-definable gain ($G^{-1}$), a first user-definable coefficient ($C_1$), a second user-definable coefficient ($C_2$), and a user-definable center frequency (CF) respectively for each IIR filters 30. $G^{-1}$, $C_1$, $C_2$, and CF are programmed into the second register 64, via its input 65, and the IIR resonator digital filter 30, as implemented here, is a single-frequency pass filter. Additionally, the CF 66 value is eventually sent via an input 19Y to the spectral display means 20 described above (shown in FIG. 1).

FIGS. 4A-4E depict each of the programming states of the multiplexer/demultiplexer 42 in each IIR resonator digital filter's 30 (shown in FIG. 2) in more detail. With each additional sample, the programming state of each multiplexer/demultiplexer 42 in each IIR resonator digital filter's 30 rotates to the following state in response to control input 45 which activates upon sensing each new audio input sample delivered via output 6 (shown in FIG. 1).

Figure 4A:
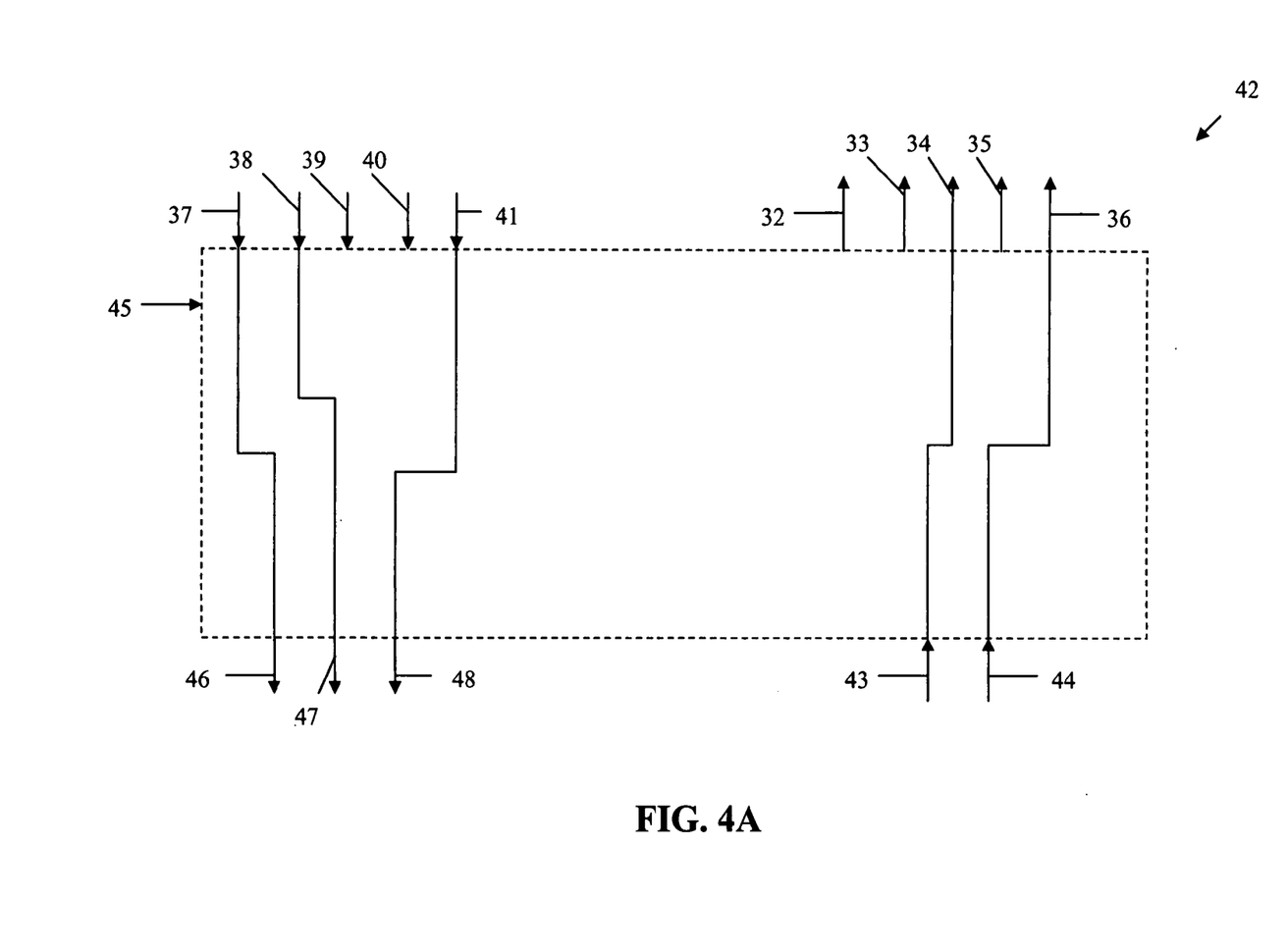
FIG. 4A is a schematic of the first state of the controller array.

FIG. 4A is a view of the first programming state of the multiplexer/demultiplexer 42 that has a control input 45. In this first programming state of the multiplexer/demultiplexer 42, the first input 37 is connected to the sixth output 46, the second input 38 is connected to the seventh output 47, the fifth input 41 is connected to the eighth output 48, the sixth input 43 is connected to the third output 34, and the seventh input 44 is connected to the fifth output 36.

Figure 4B:
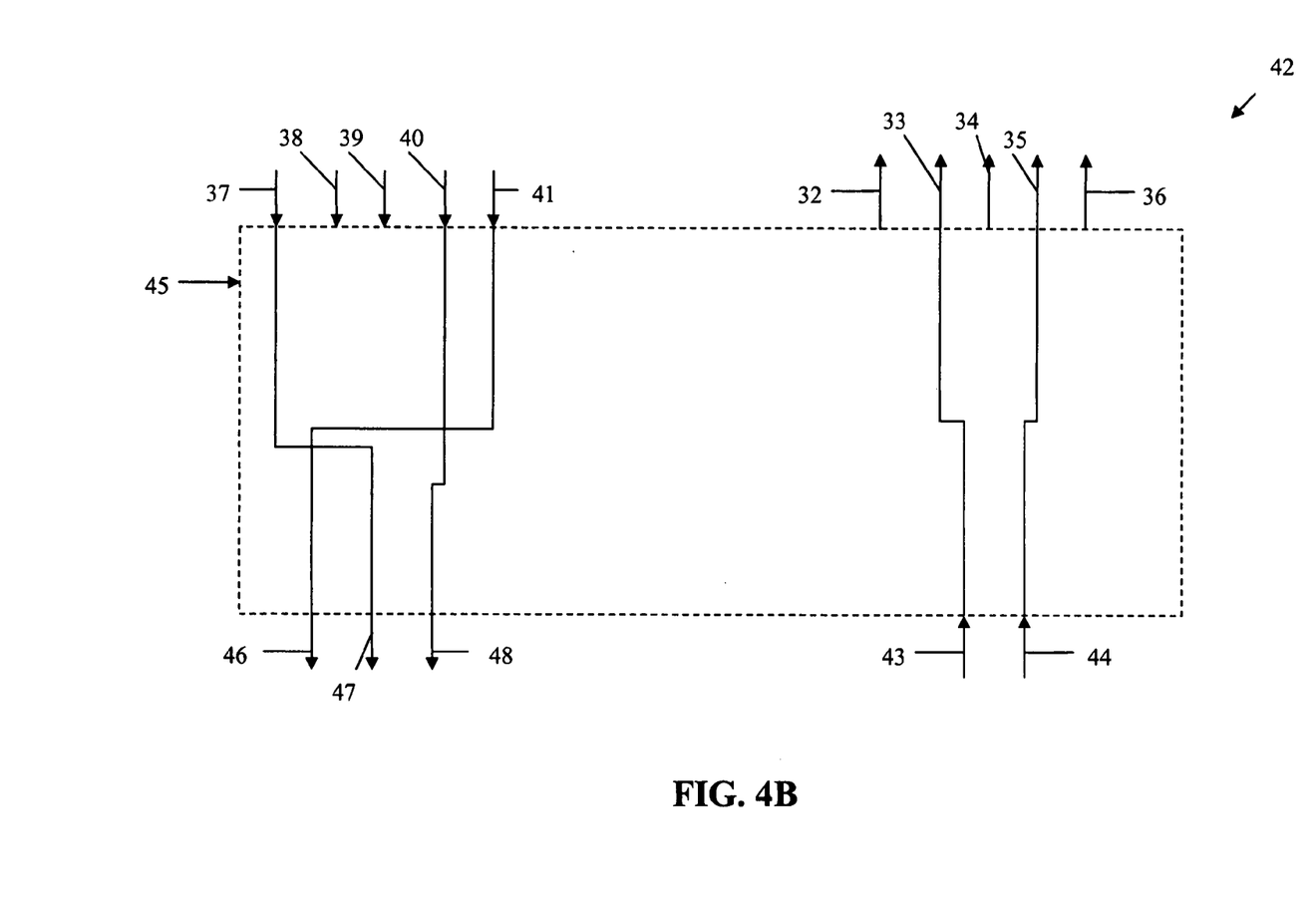
FIG. 4B is a schematic of the second state of the controller array.

FIG. 4B is a view of the second programming state of the multiplexer/demultiplexer 42 that has a control input 45. In this second programming state of the multiplexer/demultiplexer 42, the fifth input 41 is connected to the sixth output 46, the first input 37 is connected to the seventh output 47, the fourth input 40 is connected to the eighth output 48, the sixth input 43 is connected to the second output 33, and the seventh input 44 is connected to the fourth output 35.

Figure 4C:
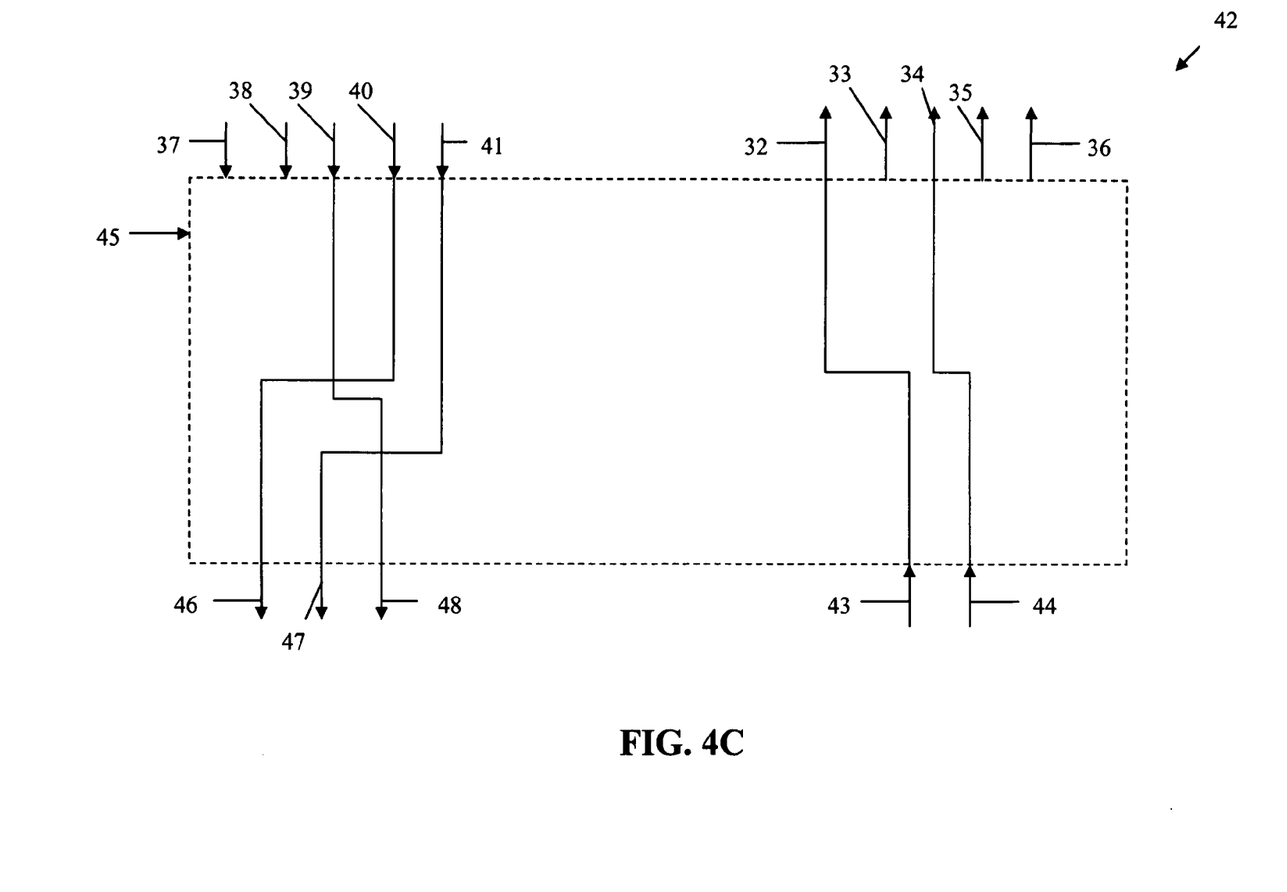
FIG. 4C is a schematic of the third state of the controller array.

FIG. 4C is a view of the third programming state of the multiplexer/demultiplexer 42 that has a control input 45. In this third programming state of the multiplexer/demultiplexer 42, the fourth input 40 is connected to the sixth output 46, the fifth input 41 is connected to the seventh output 47, the third input 39 is connected to the eighth output 48, the sixth input 43 is connected to the first output 32, and the seventh input 44 is connected to the third output 34.

Figure 4D:
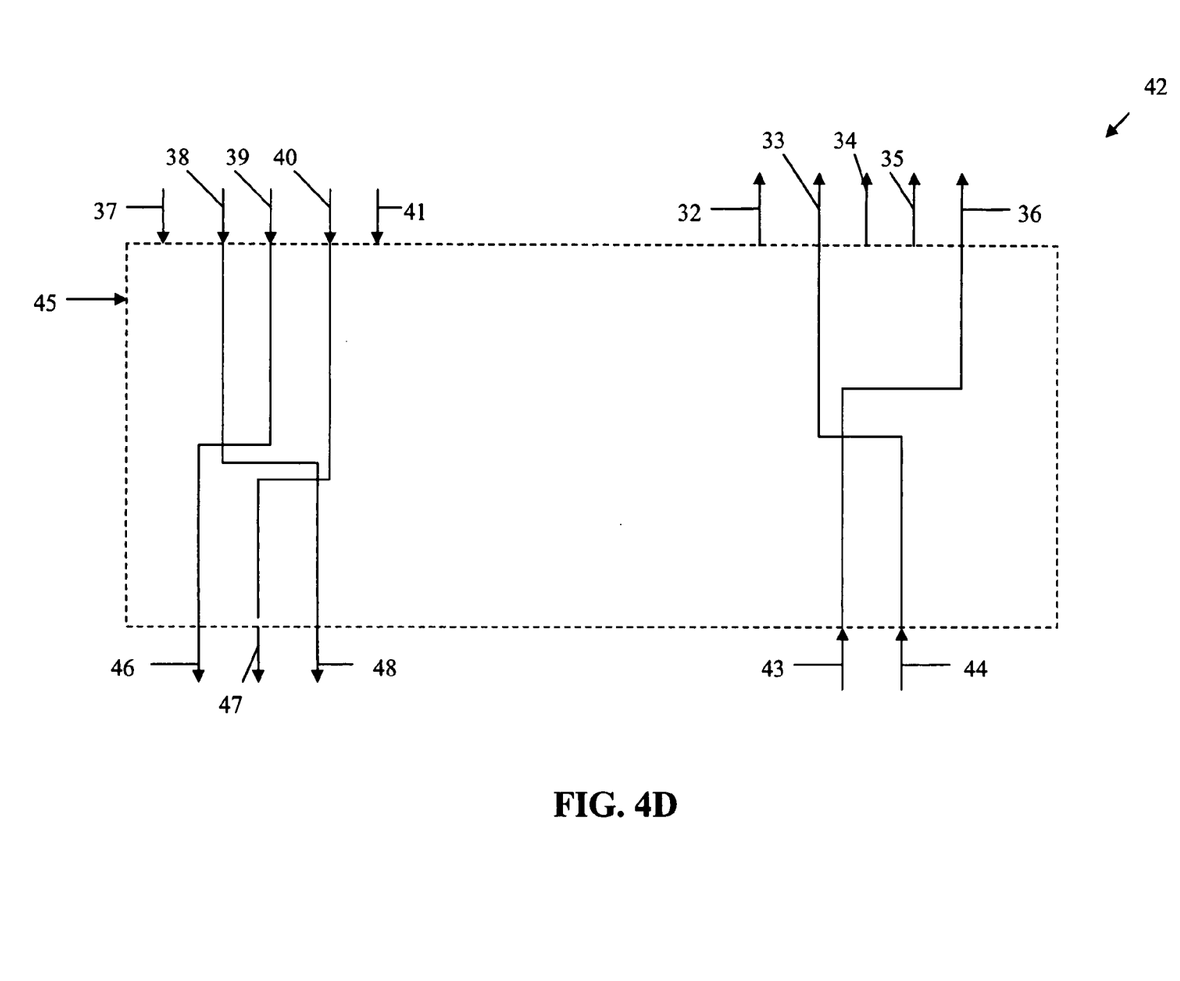
FIG. 4D is a schematic of the fourth state of the controller array.

FIG. 4D is a view of the fourth programming state of the multiplexer/demultiplexer 42 that has a control input 45. In this fourth programming state of the multiplexer/demultiplexer 42, the third input 39 is connected to the sixth output 46, the fourth input 40 is connected to the seventh output 47, the second input 38 is connected to the eighth output 48, the sixth input 43 is connected to the fifth output 36, and the seventh 44 input is connected to the second output 33.

Figure 4E:
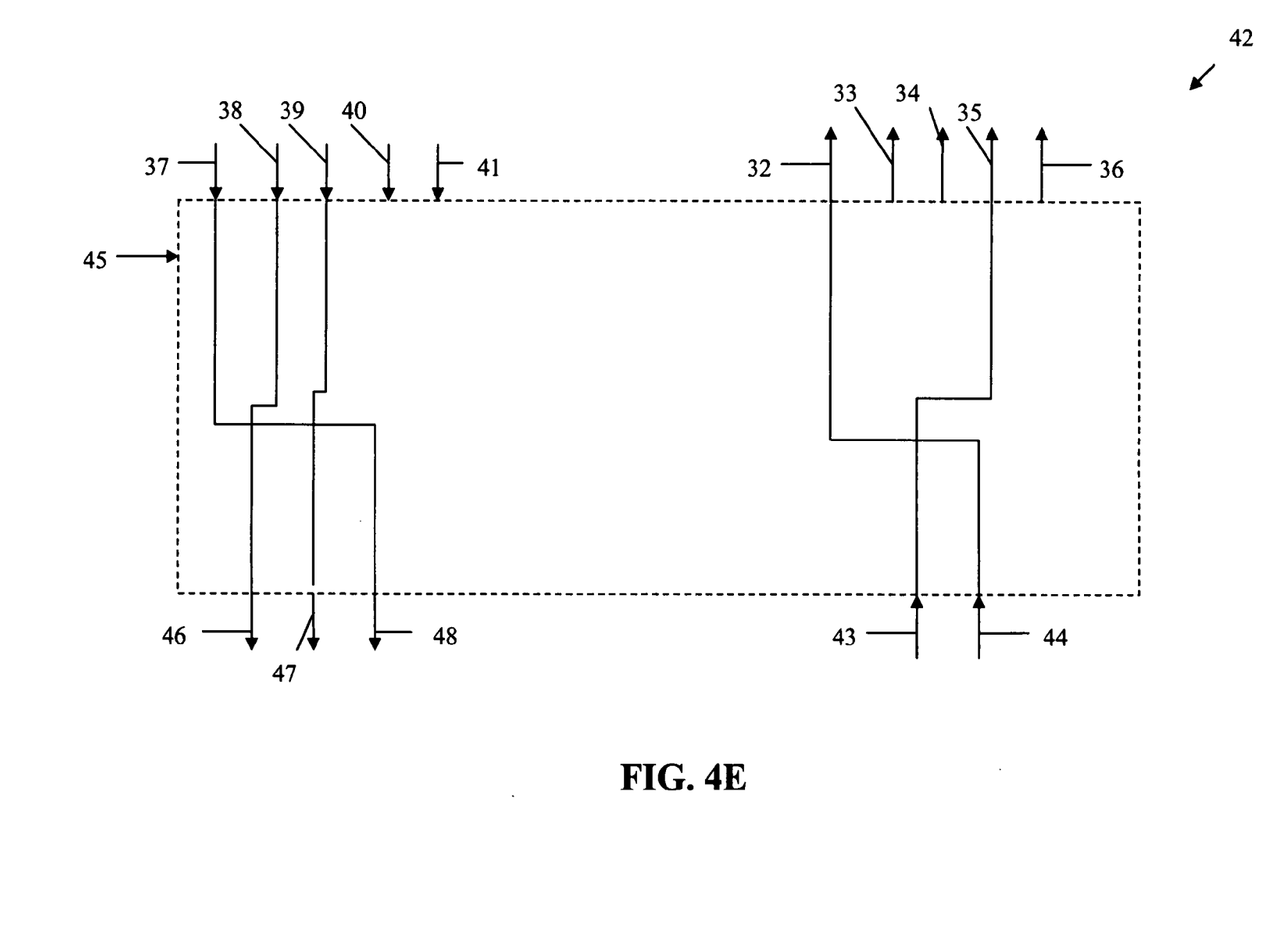
FIG. 4E is a schematic of the fifth state of the controller array.

FIG. 4E is a view of the fifth programming state of the multiplexer/demultiplexer 42 that has a control input 45. In this fifth programming state of the multiplexer/demultiplexer 42, the second input 38 is connected to the sixth output 46, the third input 39 is connected to the seventh output 47, the first input 37 is connected to the eighth output 48, the sixth input 43 is connected to the fourth output 35, and the seventh input 44 is connected to the first output 32.

While the preferred embodiment has been disclosed and illustrated, a variety of substitutions and modifications can be made to the present invention without departing from the scope of the invention.

What is claimed is:

1. A device for voice identification, comprising:
a) a receiver, having an input, and having an output;
b) a segmenter, having a first input, having a second input, having a third input, and having one output;
c) a plurality of infinite impulse response (IIR) resonator digital filters, where each of said plurality of IIR resonator digital filters has an input connected to said output of said segmenter, an output, and further comprises:
  i. a first register, having a first input, having a second input, having a third input, having a fourth input, having a fifth input, having a first output, having a second output, having a third output, having a fourth output, and having a fifth output;
  ii. a multiplexer/demultiplexer, having a first input connected to said first output of said first register, having a second input connected to said second output of said first register, having a third input connected to said third output of said first register, having a fourth input connected to said fourth output of said first register, having a fifth input connected to said fifth output of said first register, having a sixth input, having a seventh input, having a control input, having a first output connected to said first input of said first register, having a second output connected to said second input of said first register, having a third output connected to said third input of said first register, having a fourth output connected to said fourth input of said first register, having a fifth output connected to said fifth input of said first register, having a sixth output, having a seventh output, and having an eighth output;
  iii. a first multiplier, having a first input connected to said sixth output of said multiplexer/demultiplexer, having a second input, and having an output;
  iv. a second multiplier, having a first input connected to said seventh output of said multiplexer/demultiplexer, having a second input, and having an output;
  v. a third multiplier, having a first input, having a second input, and having an output connected to said sixth input of said multiplexer/demultiplexer;
  vi. an adder, having a first input connected to said output of said first multiplier, having a second input connected to said output of said second multiplier, having a third input connected to said output of said third multiplier, and having an output;
  vii. a subtractor, having a first input connected to said output of said adder, having a second input connected to said eighth output of said multiplexer/demultiplexer, having an output connected to said seventh input of said multiplexer/demultiplexer; and
  viii. a second register, having a first input, having a first output connected to said first input of said third multiplier, having a second output connected to said second input of said second multiplier, having a third output connected to said second input of said first multiplier, and having a fourth output;
d) a resolver, having a plurality of outputs equal to said plurality of IIR resonator digital filters plus 3 additional outputs, and having a plurality of inputs equal to said plurality of IIR resonator digital filters plus one additional input, where each of said plurality of inputs is connected to each of said outputs of each of said plurality of IIR resonator digital filters;
e) a first advancer, having an input connected to one of said plurality of outputs of said resolver and an output connected to said second input of said segmenter;
f) a second advancer, having an input connected to one of said plurality of outputs of said resolver and an output connected to said one additional input of said resolver;
g) a buffer, having a plurality of inputs, three less than said outputs of said resolver that are connected to said plurality of outputs of said resolver, and a plurality of outputs equal to a value of P;
h) a display means, where said display has a plurality of inputs such that each of said plurality of inputs of said display means is connected to one of said plurality of outputs of said buffer and said fourth output of said second register; and
i) an artificial neural network having a plurality of outputs equal to a value of C and having a plurality of inputs equal to said value of P, where each of said plurality of inputs is connected to each of said plurality of outputs of said buffer.

2. The device of claim 1, wherein said multiplexer/demultiplexer includes five programming states selected from a group of programming states consisting of:
a) a first logical state where said first input is connected to said sixth output, said second input is connected to said seventh output, said fifth input is connected to said eighth output, said sixth input is connected to said third output, said seventh input is connected to said fifth output;
b) a second logical state where said fifth input is connected to said sixth output, said first input is connected to said seventh output, said fourth input is connected to said eighth output, said sixth input is connected to said second output, said seventh input is connected to said fourth output;
c) a third logical state where said fourth input is connected to said sixth output, said fifth input is connected to said seventh output, said third input is connected to said eighth output, said sixth input is connected to said first output, said seventh input is connected to said third output;

d) a fourth logical state where said third input is connected to said sixth output, said fourth input is connected to said seventh output, said second input is connected to said eighth output, said sixth input is connected to said fifth output, said seventh input is connected to said second output; and
e) a fifth logical state where said second input is connected to said sixth output, said third input is connected to said seventh output, said first input is connected to said eighth output, said sixth input is connected to said fourth output, said seventh input is connected to said first output.

* * * * *